United States Patent
Minami et al.

(10) Patent No.: US 6,830,501 B2
(45) Date of Patent: Dec. 14, 2004

(54) END FACE POLISHING DEVICE (75) Inventors: Kouji Minami, Chiba (JP); Hisayuki Hirayama, Chiba (JP); Kisaburo Yoshida, Chiba (JP); Masaharu Sugiyama, Chiba (JP)

(73) Assignee: Seiko Instruments, Inc., Chiba (JP)

( * ) Notice: Subject to any disclaimer, the term of this patent is extended or adjusted under 35 U.S.C. 154(b) by 167 days.

(21) Appl. No.: 10/062,752

(22) Filed: Feb. 1, 2002

(65) Prior Publication Data
US 2003/0148713 A1 Aug. 7, 2003

(51) Int. Cl.[7] .................................................. B24B 7/22
(52) U.S. Cl. .................................... 451/41; 451/271
(58) Field of Search .......................... 451/41, 271, 357, 451/270, 288

(56) References Cited

U.S. PATENT DOCUMENTS

| | | | | | |
|---|---|---|---|---|---|
| 2,320,376 A | * | 6/1943 | Mueller | ...................... | 451/271 |
| 3,172,241 A | * | 3/1965 | Habenicht | .................... | 451/271 |
| 4,291,502 A | * | 9/1981 | Grimsby et al. | ............ | 451/271 |
| 4,726,150 A | * | 2/1988 | Nishio et al. | ............... | 451/271 |
| 5,184,433 A | * | 2/1993 | Maack et al. | .................. | 451/41 |
| 5,516,328 A | * | 5/1996 | Kawada | ...................... | 451/259 |
| 5,791,976 A | * | 8/1998 | Honda | ......................... | 451/288 |
| 6,471,570 B1 | * | 10/2002 | Minami et al. | ............. | 451/271 |

* cited by examiner

Primary Examiner—Robert A. Rose
(74) Attorney, Agent, or Firm—Adams & Wilks (57) ABSTRACT

An end face polishing device has a first revolution shaft mounted for undergoing revolving movement about a first axis, a rotational shaft mounted for undergoing rotation about a second axis eccentric from the first axis, and a second revolution shaft mounted for undergoing revolving movement about a third axis eccentric from the second axis. A polishing disc is connected to the second revolution shaft for revolving movement therewith.

15 Claims, 10 Drawing Sheets

END FACE POLISHING DEVICE

FIELD OF THE INVENTION

BACKGROUND OF THE INVENTION

The present invention relates to an end face polishing device polishing end face of bar member such as optical communication fiber.

Figure 1:
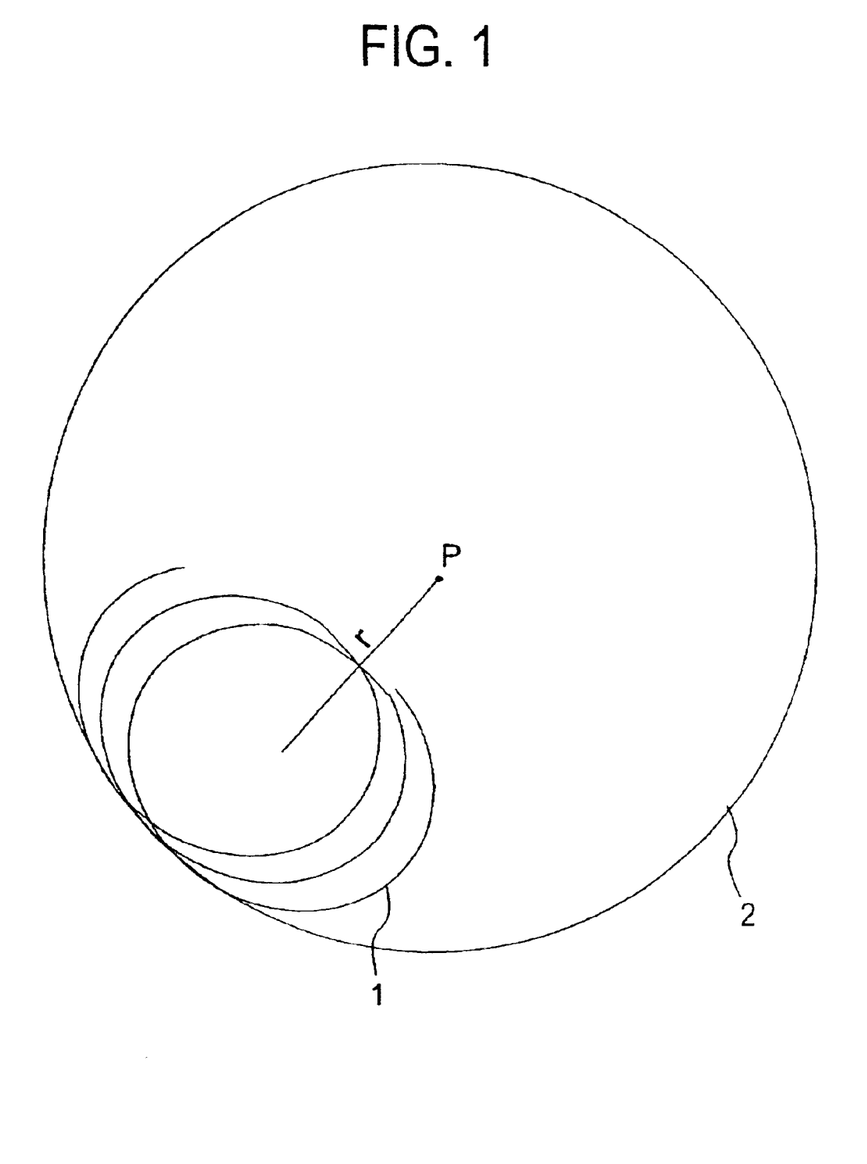
FIG. 1 is a plan view showing polishing locus of the polishing device of related art.
Figure 2:
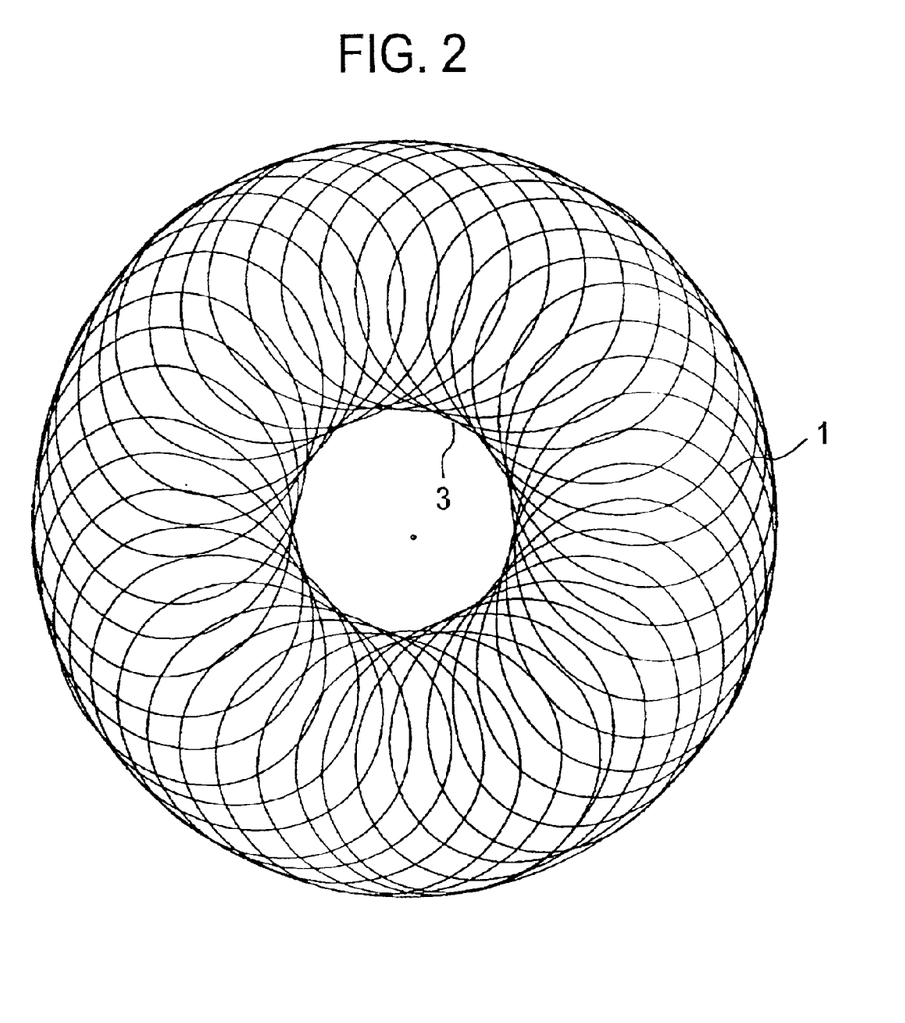
FIG. 2 is a plan view showing polishing locus of the polishing device of related art.

In the end face polishing device of the related art, polishing is performed by pressing a polishing disc moving by a combination of rotation and revolution on an end face of a fixed bar member as described in Japanese Patent Laid-Open No. 296451/2000. A locus of polishing has a shape where plural circles moving on a circumference of radius r to a center P overlap continuously as shown by locus 1 in FIG. 1. The state of making a circuit of an external circumference 2 of the locus 1 is shown in FIG. 2. As shown in FIG. 2, an internal circumference 3 of the locus 1 has much overlapping of the locus, the abrasion quantity of a polishing sheet is increased, and the polishing sheet can not be used uniformly. Accordingly, efficient use of the sheet is difficult to accomplish.

It is an object of the present invention is to prevent local concentration of the locus overlapping of polishing on the polishing sheet and to improve efficiency of polishing.

In the polishing device of the related art, since a locus of the end face on the polishing sheet consists of circles moving along a circumference, it is necessary to increase the rotational speed of rotation or revolution in order to increase the polishing speed. However, an increase in the rotational speed results in scattering of abrasive liquid caused by centrifugal force, thereby making it difficult to perform the polishing operation.

SUMMARY OF THE INVENTION

In the present invention, an end face polishing device comprises a pressing unit for pressing an end face of a fixed bar member to a polishing sheet and a driving unit for driving the polishing sheet in a roulette-like movement while rotating on a circumference parallel to the end face of the bar member. Here, a roulette shape movement means a curved line where a fixed point on another curved line moves when another curved line rolls along a fixed curved line.

In another aspect, the present invention is directed to a method for polishing an end face of a fixed bar member by pressing the end face of the fixed bar member against a polishing sheet, driving the polishing sheet in a roulette shape movement while rotating on a circumference parallel to the end face of the bar member.

DETAILED DESCRIPTION OF PREFERRED EMBODIMENTS

The invention is an end face polishing device comprising a pressing unit pressing an end face of a fixed bar member to a polishing sheet and a driving unit driving the polishing sheet in a roulette-like movement while rotating on circumference parallel to the end face of the bar member. By using roulette-like movement relative speed of end face of a bar member to a polishing sheet varies, and polishing speed can be increased at high area in relative speed. Oppositely, in low area in relative speed, time that polishing liquid flows into area where quantity of polishing liquid decreases by contact of the end face on the polishing sheet increases, quantity of the polishing liquid becomes constant even when loci of polishing are overlapped, and high symmetric to axis of the bar member, that is, little eccentric polishing becomes possible.

In the invention, the polishing device has a rotating shaft eccentric from revolution center of a first revolution shaft in the revolution shaft, a second revolution shaft eccentric from the rotation center of the rotation shaft in the rotation shaft, and a polishing disc connected to the second revolution shaft.

Further, in the end face polishing device, the second revolution shaft has an internal gear fixed at a frame of the end face polishing device, a first transfer gear engaging with the internal gear, a rotation shaft having a second transfer gear at opposite end portion of the end portion of the first transfer gear, and an external gear engaging with the second transfer gear.

Figure 3:
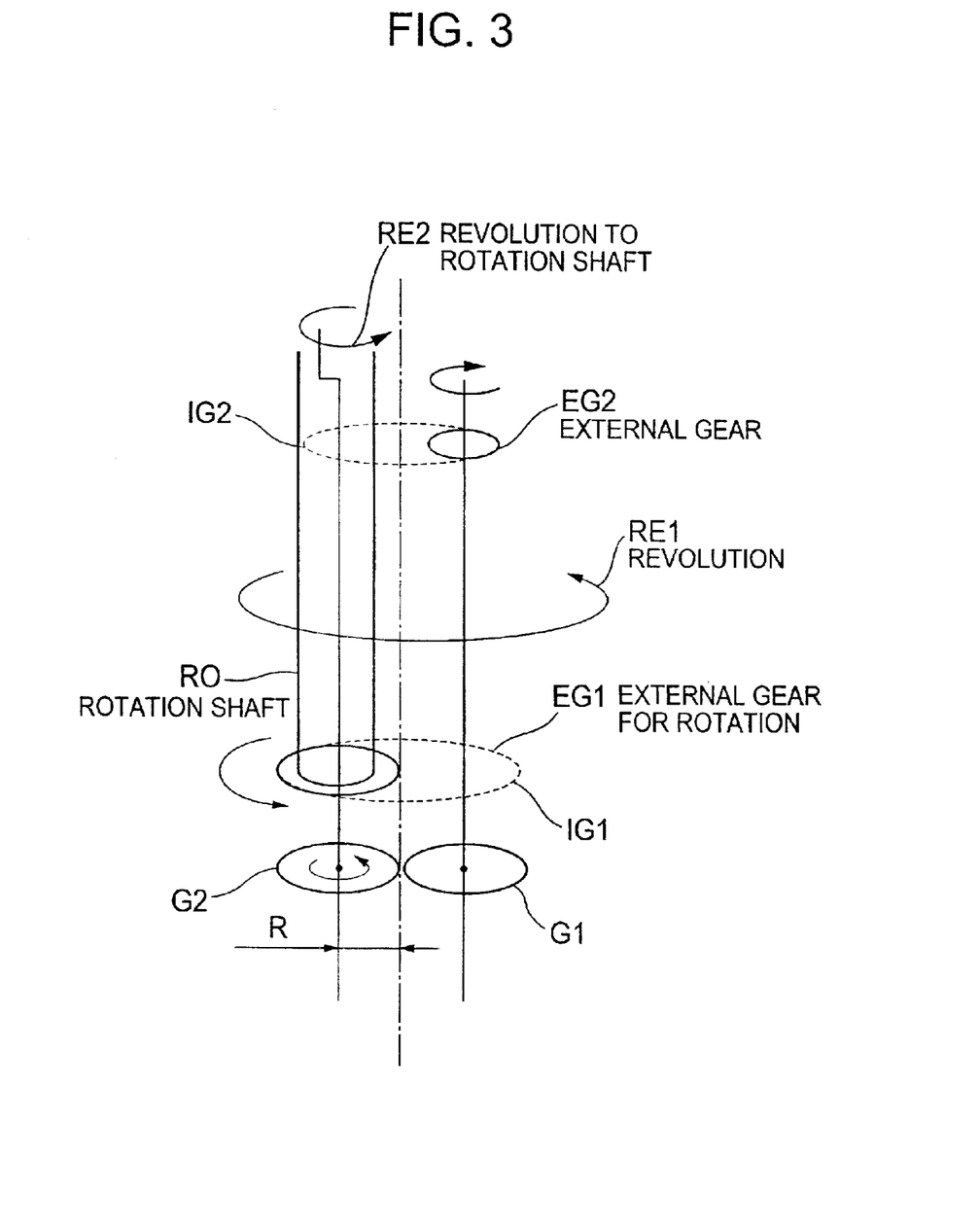
FIG. 3 is a view showing a polishing mechanism according to the invention.

FIG. 3 is a view showing characteristic part of the driving mechanism of the polishing device according to the invention. In the figure, the whole performs revolution RE1. Revolution center of revolution shaft and center position are eccentric R, and inner part of rotation shaft RO rotating by the external gear EG1 engaging with the gear IG1 is performed with revolution RE2 to rotation shaft by revolution of the gear G2 engaging with the gear G1 driven by the external gear EG2 engaging with the internal gear IG2.

BACKGROUND INFORMATION

In the end face polishing device, the first revolution shaft is connected to a motor through a timing belt.

In the end face polishing device, the rotation shaft is connected to a motor through another timing belt.

Further, the end face polishing device has an ultra sonic actuator contacting outer circumference portion of the first revolution shaft and revolving the revolution shaft. By using the ultra sonic actuator, a polishing device of high torque and small size can be obtained.

The invention has steps of pressing an end face of a fixed bar member to a polishing sheet, driving the polishing sheet with roulette-like movement while rotating on circumference parallel to the end face of the bar member, and making the end face for polishing disc.

Here, the roulette-like movement may be a cycloid. Further, the roulette-like movement may be an internal cycloid. Moreover, the roulette-like movement may be an external cycloid.

Further, the roulette-like movement may be a relative trochoid inscribed to a first circle and drawn by a point fixed at a second circle smaller in diameter than the first circle. The roulette-like movement may be a relative external trochoid inscribed to the first circle and drawn by a point fixed at out of the second circle smaller in diameter than the first circle.

Especially, the roulette-like movement may be a relative internal trochoid inscribed to a first circle and drawn by a point fixed in the second circle smaller in diameter than the first circle.

Here, an XY table can be used for driving the polishing sheet. By using the XY table, a polishing device can be designed without using complex driving mechanism of rotation system such as an epicyclic gear for usual rotation and revolution. Further, by using large XY table in a moving distance, the polishing sheet is kept away far from the bar member, the state of the end face of the bar member in the middle of polishing, a polishing sheet different in roughness is arranged at another area of the XY table, the same polishing device can be used from coarse polishing to finishing polishing.

By varying the driving speed using a single sheet or plural sheets, polishing speed can be decreased at initial coarse polishing so as to reduce load to driving system large in frictional resistance. Because frictional resistance is small at finishing polishing, driving speed is increased, and polishing speed is increased so as to reduce whole polishing time.

An embodiment according to the invention will be described in detail with reference to FIGS. 4–9 FIG. 4 is a sectional view showing a driving mechanism of the end face polishing device according to the invention. An elastic body 30 is arranged on a top portion of a polishing disc 10 through a frame 20 of an external circumference, a polishing sheet 40 is arranged on the elastic body 30, an end face of a bar member is pressed against the sheet 40 during a polishing operation.

Figure 4:
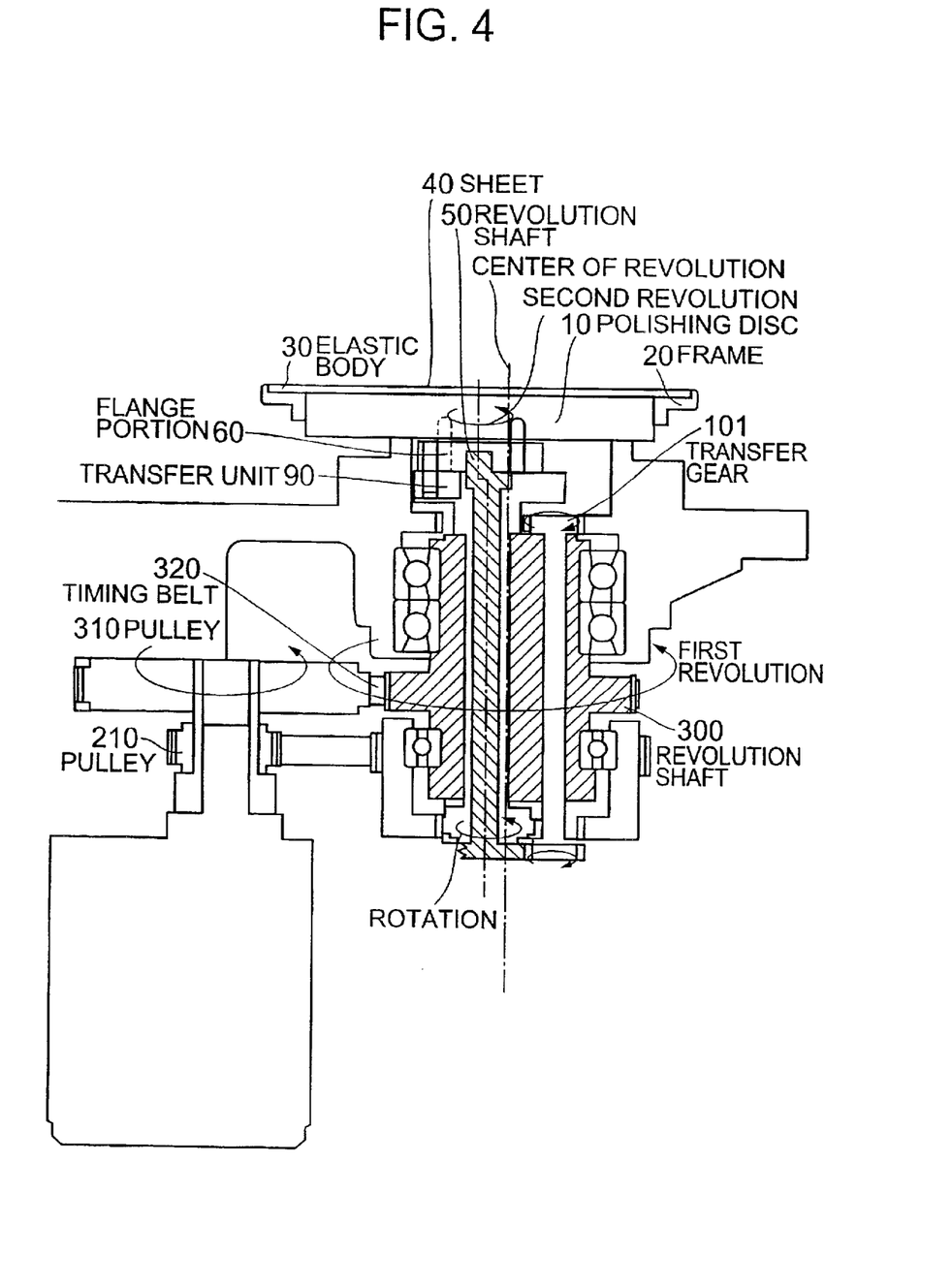
FIG. 4 is a sectional view of a polishing device according to the invention.

A lower face side of the polishing disc 10 and a flange 60 on a revolution shaft 50 are connected through plural fixed pins 70a and 70b, and the polishing disc 10 is supported by the revolution shaft 50. The revolution shaft 50 is connected to a rotation shaft 80 at eccentric position in designated quantity to the rotation shaft 80 through a transfer gear 100 is connected to a transfer gear 101 coaxially. The transfer gear 101 engages with an internal gear in the frame of main body of the polishing device.

The lower part of the revolution shaft 50 is connected to a rotation portion 230 through a timing belt 220 arranged at outer side of a pulley 210 connected to a driving shaft of a motor 200 and engages with an internal gear of the rotation portion 230.

A revolution shaft 300 is connected to the driving shaft of the motor 200 though a pulley 310 and a timing belt 320. The rotation shaft 80 is arranged in the revolution shaft 300.

Figure 5:
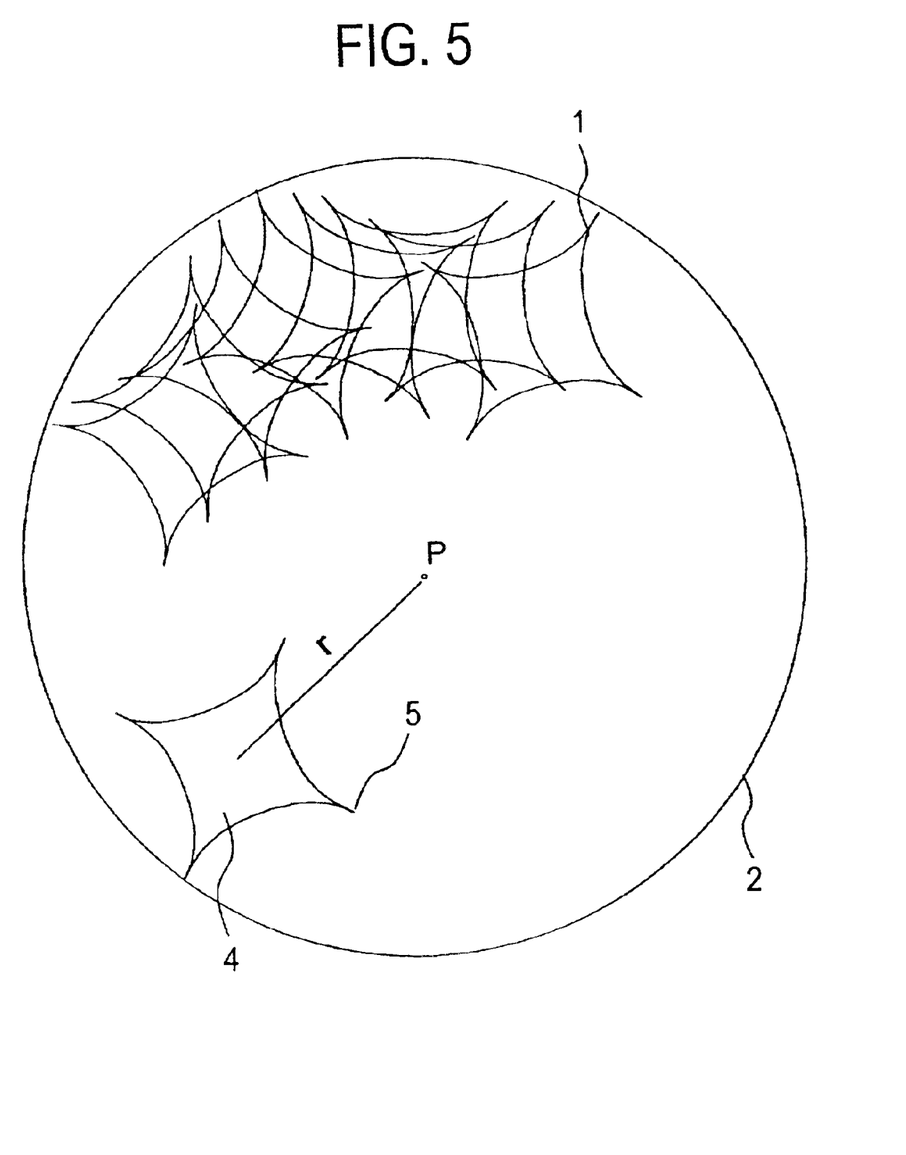
FIG. 5 is a plan view showing polishing locus of the polishing device according to the invention.

A polishing locus of the polishing device according to the invention will be described below. FIG. 5 is a view showing the instance when the revolution radius in the rotation shaft is large, and the locus is a continued locus 1 where a shape 4 is given a roulette-like movement in the form of a cycloid shape and has sharp points 5 and revolves in the external circumference 2 where circumference of radius r is center through center P of external circumference 2. By this polishing locus, overlapping of locus of the internal circumference portion 3 is removed.

Figure 6:
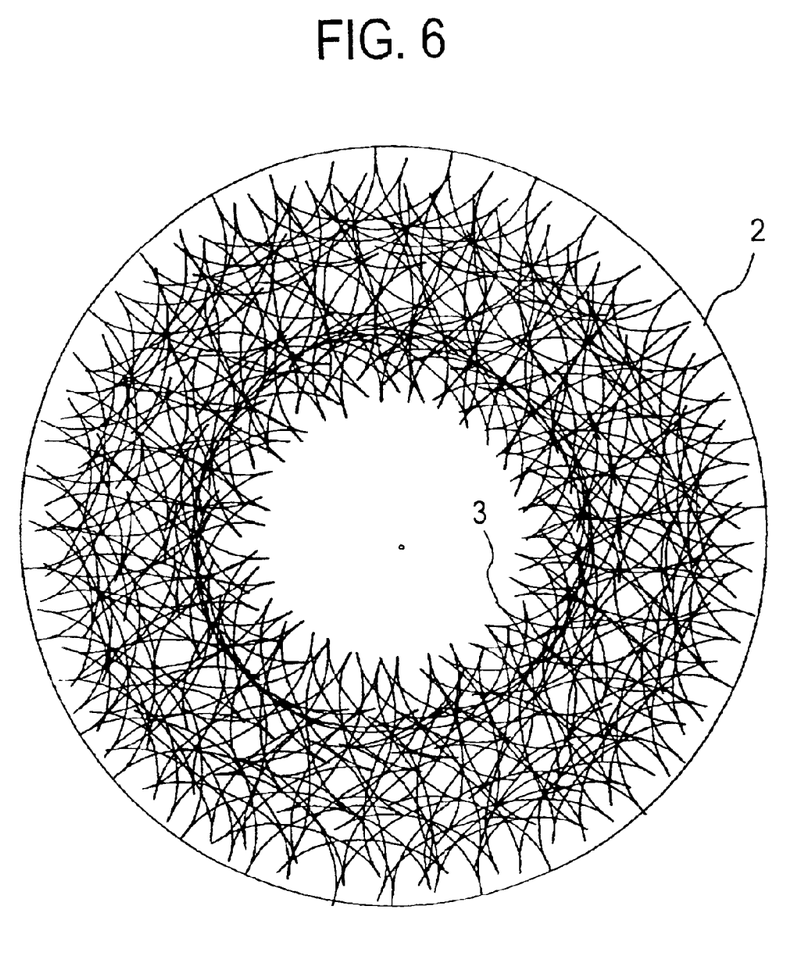
FIG. 6 is a plan view showing polishing locus of the polishing device according to the invention.

FIG. 6 is a view where the locus 1 goes around in the external circumference 2.

Figure 7:
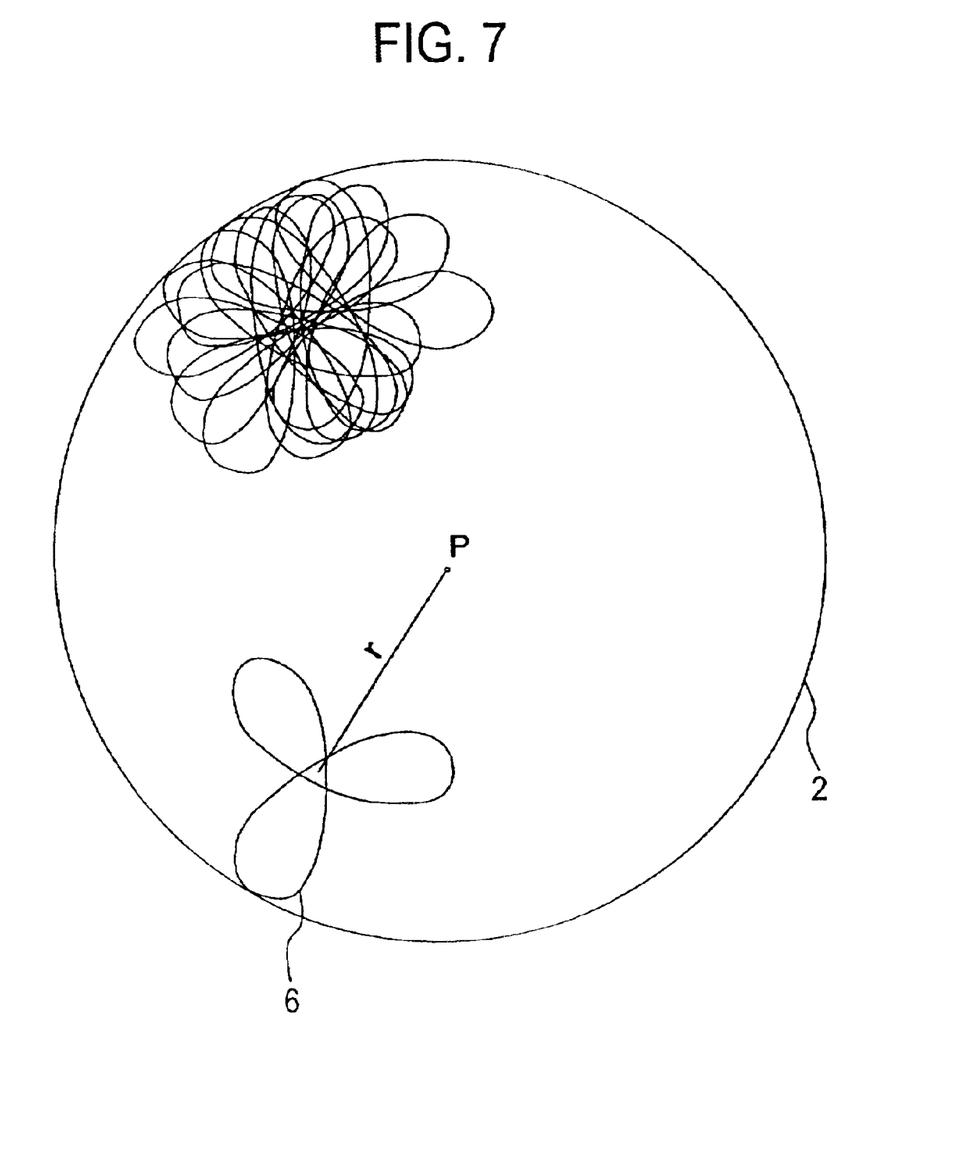
FIG. 7 is a plan view showing polishing locus of the polishing device according to the invention.
Figure 8:
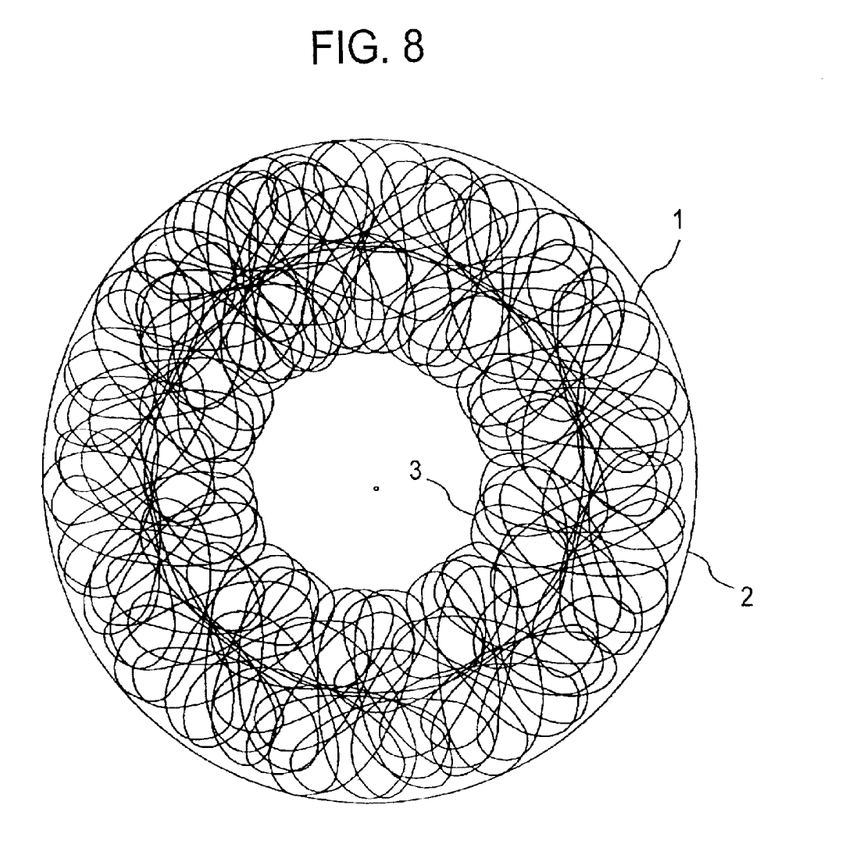
FIG. 8 is a plan view showing polishing locus of the polishing device according to the invention.

FIG. 7 is a view when revolution radius in the rotation shaft is small, a shape 6 of locus becomes a shape of three leaves. By driving the shape continuously, the locus becomes like locus 1. Further, by going around in the external circumference 2, the density of locus of the internal circumference 3 becomes low as shown in the locus 1 of FIG. 8.

Figure 9:
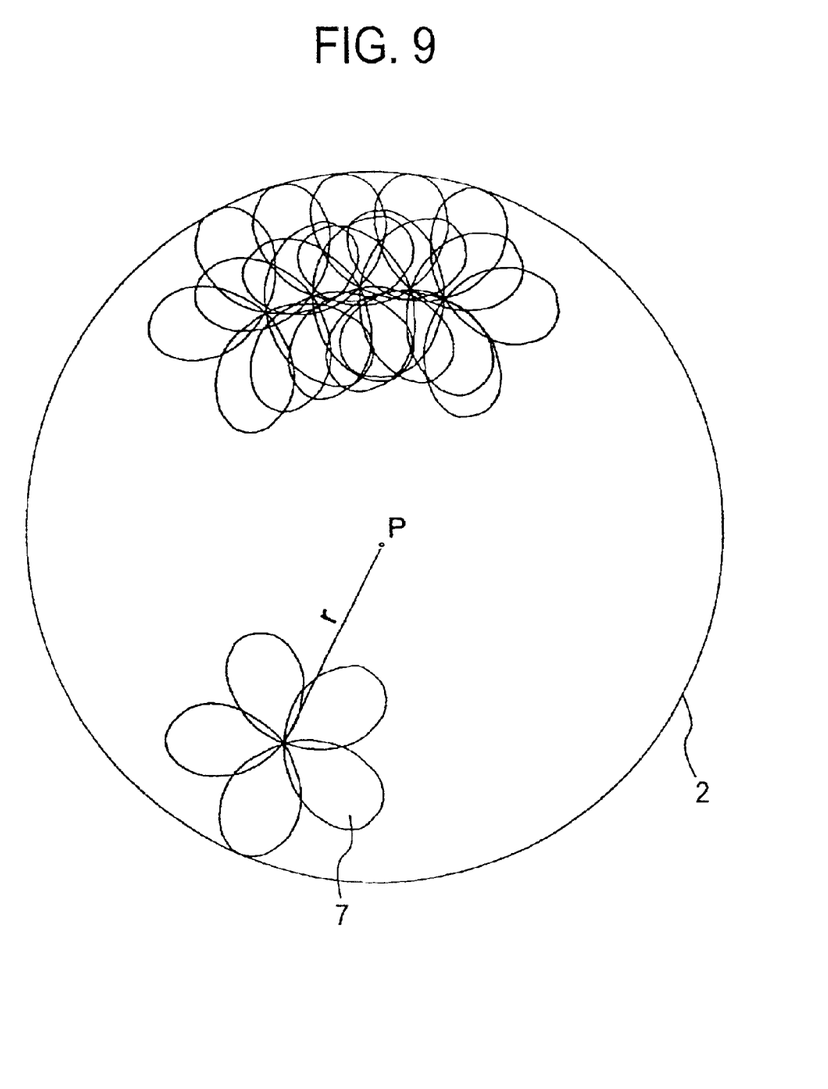
FIG. 9 is a plan view showing polishing locus of the polishing device according to the invention.
Figure 10:
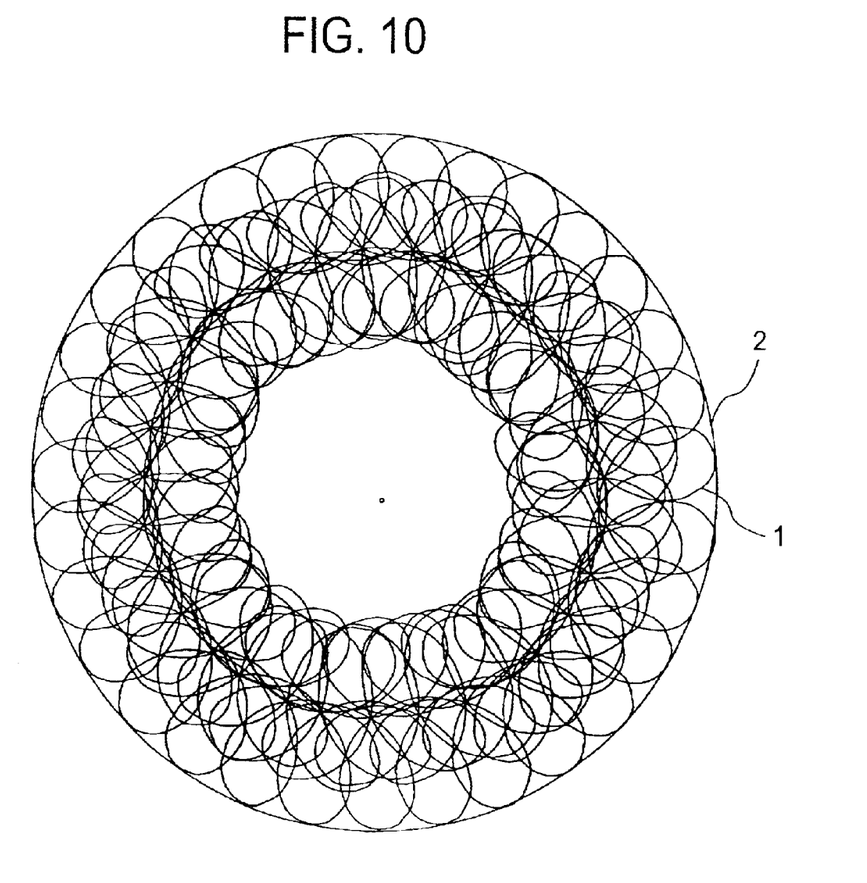
FIG. 10 is a plan view showing polishing locus of the polishing device according to the invention.

FIG. 9 is a view of the case when the ratio of revolution diameter is further varied. The locus becomes a shape 7 of locus having five times of symmetric axis in the external circumference 2. FIG. 10 is a view where similarly the shape of the locus 1 goes around driving continuously, and in which a high density locus 1 is obtained in the external circumference 2 so that the polishing sheet can be used efficiently.

According to the invention, since a locus of the end face is given a roulette-like motion while rotating on the circumference, life of the polishing sheet can be made long and the polishing time can be decreased to provide a polishing device having a high polishing speed.

What is claimed is:

1. An end face polishing device for polishing an end face of a workpiece, comprising: a driving unit having a first revolution shaft mounted for undergoing revolving movement about a first axis, a rotational shaft mounted for undergoing rotation about a second axis eccentric from the first axis, and a second revolution shaft mounted for undergoing revolving movement about a third axis eccentric from the second axis; a polishing sheet having a polishing surface and connected to the first revolution shaft, the rotational shaft, and the second revolution shaft of the driving unit for undergoing corresponding revolving and rotational movement therewith; and a pressing unit for pressing a workpiece during revolving and rotational movement of the polishing sheet to bring an end face of the workpiece into pressure contact with the polishing surface so that the polishing surface lies in a plane parallel to the end face of the workpiece to thereby polish the end face of the workpiece.

2. An end face polishing device comprising: a first revolution shaft mounted for undergoing revolving movement about a first axis; a rotational shaft mounted for undergoing rotation about a second axis eccentric from the first axis; a second revolution shaft mounted for undergoing revolving movement about a third axis eccentric from the second axis; and a polishing disc connected to the second revolution shaft for revolving movement therewith.

3. An end face polishing device according to claim 2; further comprising a frame for connecting an elastic body to a surface of the polishing disc; and wherein the second revolution shaft has an internal gear connected to the frame, a first transfer gear engaging the internal gear, a rotational member having a second transfer gear disposed opposite to the first transfer gear, and an external gear engaging the second transfer gear.

4. An end face polishing device according to claim 3; wherein the first revolution shaft is connected to a motor through a first timing belt.

5. An end face polishing device according to claim 4; wherein the rotational shaft is connected to the motor through a second timing belt.

6. An end face polishing device according to claim 2; further comprising an ultrasonic actuator contacting an external circumference portion of the first revolution shaft for rotationally driving the rotational shaft.

7. A method for polishing an end face of a workpiece, comprising the steps of: providing a polishing sheet having a polishing surface; driving the polishing sheet to impart a preselected motion to the polishing sheet by imparting revolving movement thereto about a first axis, to impart rotation thereto about a second axis eccentric from the first axis, and to impart revolving movement thereto about a third axis eccentric from the second axis; and pressing a workpiece during driving of the polishing sheet to bring an end face of the workpiece into pressure contact with the polishing surface so that the polishing surface lies in a plane parallel to the end face of the workpiece to thereby polish the end face of the workpiece.

8. A method according to claim 7; wherein the preselected motion comprises a motion generally in the form of a cycloid.

9. A method according to claim 7; wherein the preselected motion comprises a motion generally in the form of an internal cycloid.

10. A method according to claim 7; wherein the preselected motion comprises a motion generally in the form of an external cycloid.

11. A method according to claim 7; wherein the preselected motion comprises a motion generally in the form of a trochoid inscribed in a first circle and drawn by a point fixed on a second circle smaller in diameter than the first circle.

12. A method according to claim 7; wherein the preselected motion comprises a motion generally in the form of an internal trochoid inscribed in a first circle and drawn by a point fixed in a second circle smaller in diameter than the first circle.

13. A method according to claim 7; wherein the preselected motion comprises a motion generally in the form of an external trochoid inscribed in a first circle and drawn by a point fixed outside of a second circle smaller in diameter than the first circle.

14. A method according to claim 7; wherein the driving step includes the step of driving the polishing sheet using an XY movement table.

15. A method according to claim 7; wherein the driving step includes the step of driving the polishing sheet with a variable driving speed.

* * * * *